March 30, 1937.      E. G. LOOMIS      2,075,735
CONTINUOUS METHOD OF AND APPARATUS FOR MAKING PLASTIC PRODUCTS
Original Filed Dec. 1, 1931      4 Sheets-Sheet 1

Evarts G. Loomis
INVENTOR.

BY Prindle, Bean & Mann
ATTORNEYS.

Evarts G Loomis
INVENTOR.
BY Prindle, Bean & Mann
ATTORNEYS.

March 30, 1937.  E. G. LOOMIS  2,075,735

CONTINUOUS METHOD OF AND APPARATUS FOR MAKING PLASTIC PRODUCTS

Original Filed Dec. 1, 1931   4 Sheets-Sheet 4

Evarts G Loomis
INVENTOR.
BY Prindle, Bean & Mann
ATTORNEYS.

Patented Mar. 30, 1937

2,075,735

UNITED STATES PATENT OFFICE 2,075,735

CONTINUOUS METHOD OF AND APPARATUS FOR MAKING PLASTIC PRODUCTS

Evarts G. Loomis, Newark, N. J.

Application December 1, 1931, Serial No. 578,261
Renewed August 14, 1936

8 Claims. (Cl. 18—6)

The present invention relates to methods for and apparatus to be used in the manufacture of plastic, semi-plastic and thermoplastic products, particularly from such materials as cellulose, casein, synthetic resins, such as phenol resins, urea, rubber and such others.

As this art is at present practiced, the method of manufacture of a finished product comprises a number of discontinuous steps extending over a period of time, sometimes as long as a year. The raw materials of whatever description are first combined chemically. To the resulting compound may be added enough solvent, plasticizer, or a combination of these substances, so as to transform the whole into a workable or plastic mass with or without the addition of heat. This plastic mass may be mixed, worked and pressed into blocks, rods, tubes, or other forms, leaving a semi-solid which may be cut or machined after seasoning into any desired shape and then polished. Besides the great time delay in manufacturing, this practice involves a heavy expenditure for block or sheet presses, calenders, sheeters, stuffers, polishing presses, or machines, etc., and requires an inordinate amount of handling space for storing partly processed material and limits the manufacturer to size and shapes he can supply without purchasing new equipment or submitting his present equipment to expensive alterations.

It is the primary object of my invention to provide means for achieving the manufacture of the above named class of products more rapidly and in fewer operations by accomplishing the forming, pressing, sheeting and polishing of the material in a continuous process.

A further object of my invention is to provide a machine capable of accomplishing in a continuous operation, the transformation of a plastic mass into a finished solid product, performing successively the required forming, pressing, sheeting, polishing and cooling.

My invention for obtaining the above objects involves a principle of continuous frictionless or semi-frictionless extrusion. It is, therefore, a further object of my invention to develop a modified extrusion mechanism capable of producing finished sheets, rods, tubes, or other shapes, of a quality comparable with that of the finished product of the present system of manufacture.

Still another object of my invention is to provide apparatus for the continuous manufacture of plastic or thermoplastic materials, which will produce a large variety of sizes and shapes as desired without requiring any major alterations of the apparatus.

Another particular feature of my invention is to provide a method or process of continuously forming products of plastic materials using extrusion in such a manner that there will be reduced friction or practically no friction involved. The pressing or forming may be carried on through any time or length desired to allow for any desired combination of heating, cooling, or final setting, thereby eliminating any tendency towards expansion, contraction, warpage, distortion, or possible variation of any variegated or orinetated effect in the final product.

Further objects of my invention will appear in the following description and its accompanying illustrations, which show apparatus embodying the principles of my invention.

In the drawings—

Figure 1:
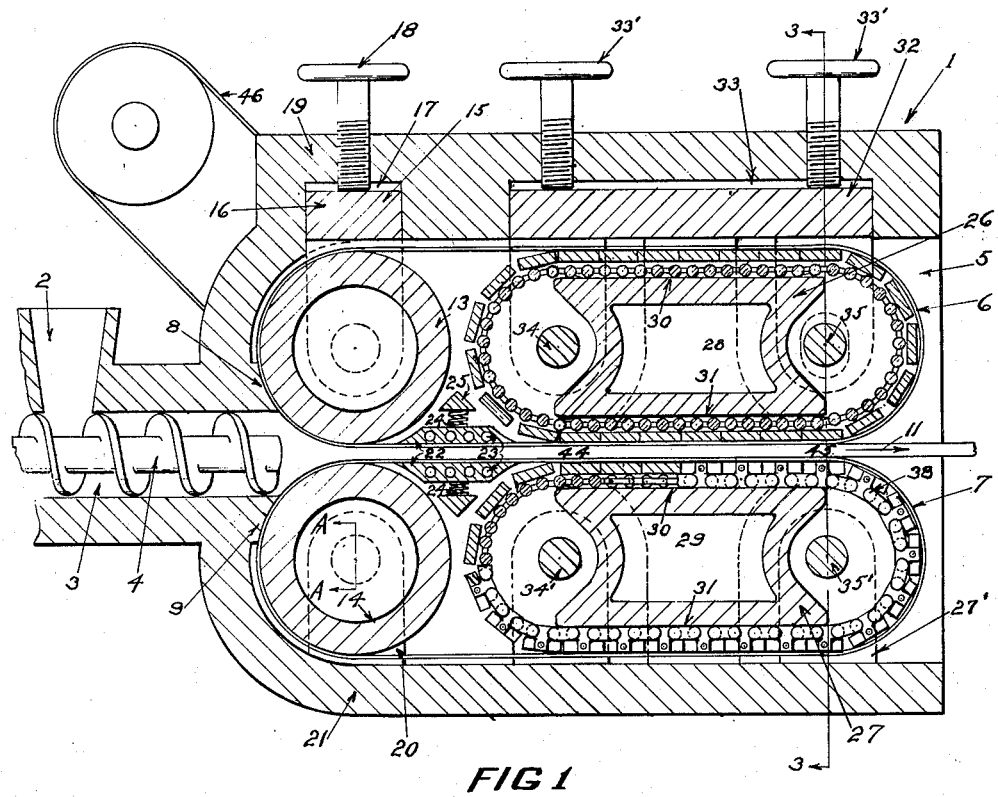
Figure 1 represents a vertical longitudnal cross section of one embodiment of my invention designed to receive irregular masses of material.
Figure 3:
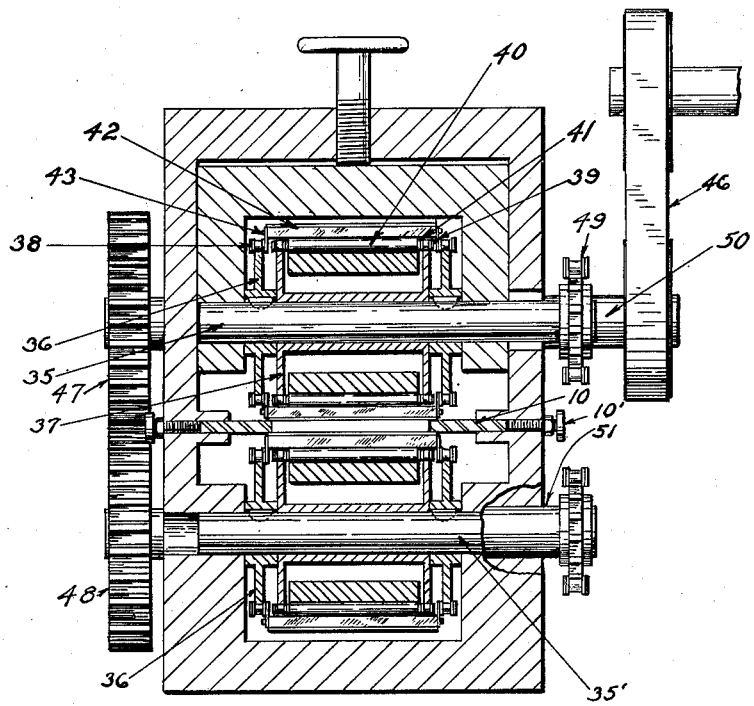
Figure 3 represents a transverse vertical cross section taken substantially on line 3—3 of Figure 1 with parts broken away to facilitate the disclosure.

Referring now to the Figures 1 and 3, reference character 1 designates a hollow casing provided at one end with a hopper 2 which communicates with a passageway or conduit 3 adapted to receive the material to be treated. Positioned in the passageway or conduit 3 is a screw conveyor 4, but it is to be understood that other conveyor means may be used. At the other end the casing is provided with an open end, as at 5. Mounted within the casing 1 are the endless belts 6 and 7. These belts may be made of polished spring steel or other metal provided with a hard, non-corroding surface. The casing 1 is provided with curved projections 8 and 9 which contact the belts and prevent the material from being forced into undesirable portions of the device. The belts are positioned at any suitable distance apart, and the material as it is forced between the belts by screw conveyor 4 fills the space between the belts. Adjustable guides 10 provided with screws 10' are mounted adjacent the inlet end of the device and function to determine the width of the sheet or article to be made. The direction of travel of the belts is shown by arrow 11.

At one end of the hollow casing 1 belts 6 and 7 pass over cylinders or hollow rolls 13 and 14 positioned one above the other which exert an initial pressure on the plastic material, the rolls being provided with hollow axles which communicate with the interior of the rolls. Roll 13 is mounted in yoke 15 which is adjustable. The top portion 16 of the yoke is slidably mounted in groove 17 in casing 1. A screw 18 passes through the top 19 of casing 1 and contacts the top portion 16 of the yoke so as to provide means for adjusting the position of roll 13. Roll 14 is mounted in a support 20 which is formed as an extension of base 21 of the casing 1. Rolls 13 and 14 are hollow or provided with any suitable means which permits temperature control of the rolls or cylinders 13 and 14. By this construction I am enabled to adjust the temperature applied to the endless belts 6 and 7 by introducing either a heating or cooling means into the interior of the rolls or cylinders. It can be readily seen that the belts being comparatively thin and in contact with the surface of rolls 13 and 14 can be quickly heated or cooled by introducing a heating or cooling medium into the rolls or cylinders.

Positioned within the casing a short distance from the rolls 13 and 14 are the supporting blocks 22 which are so formed that they contact the inner surface of the belts and support the same when material is passing between the belts. These blocks 22 are provided with passageways 23 to provide means for controlling the temperature of the blocks. The blocks are resiliently held in position by springs 24 which abut fixed members 25.

From the supporting blocks 22 the belts 6 and 7 pass to the continuous pressing zone where the material between the belts is compressed and moved toward the open end 5 of casing 1. It is necessary to apply considerable amounts of pressure to the plastic material in order to form it into a uniform homogeneous mass. I effect this by means of the following construction. In this zone are mounted hollow supports 26 and 27 having openings 28 and 29 so as to permit temperature regulation of the supports. Each support is provided with a top flat surface 30 and bottom flat surface 31. The lower support 27 is rigidly held in position by being secured to the standards 27' on base 21 of casing 1. The upper support is mounted in an adjustable slidable yoke 32 which is positioned in a groove 33 in the top of casing 1. Screws 33' are provided in the top of casing 1 to bear against the top position of yoke 32, and adjust the position of the assembly to any required degree of parallel or angular relation and pressure. Rotatably mounted in yoke 32 are shafts 34 and 35. Each of these shafts is provided with sprockets 36 and 37 which are rotated respectively by chains 38 and 39 (see Figure 3). Chain 39 has rollers 40 attached thereto by means of links 41 to form an endless rolling support for blocks 42 and transmit the pressure to frames 26 and 27. These blocks are attached to chain 38 by means of links 43 and are so mounted as to abut each other and form a flat solid supporting surface between points 44 and 45 for belts 6 and 7. A similar arrangement of rollers and blocks is provided for the lower support. It can be seen that blocks 42 rolling on the rollers or balls 40, moving at the same speed as the belts 6 and 7, provide a practically frictionless nozzle or pressing means through which the plastic material is carried and is subjected to any degree of heat and pressure as may be required.

The machine may be driven by means of belt 46 which drives roll 13, which in turn drives roll 14 through meshing gears 47 and 48 in the conventional manner. Sprocket 36 on shaft 35 is driven by chain 49 from the shaft 50 for roll 13 and sprocket 36 of shaft 35' of the lower assembly is driven from shaft 51 for roll 14. It is to be understood that the drive of the rolls and sprockets is so arranged that the speed of the belts 6 and 7 and blocks 42 will move at exactly the same speed in the same direction.

In the sheeting and forming of material under present methods owing to the fact that the process takes considerable time in producing the product in its final form, involving chemical changes, changing of the temperature, pressure and shape, considerable handling of the material is required, whereas, by practicing my invention, due to the fact of combining these operations and requirements and having the automatic control of temperature, pressure and time conditions, it is practicable to reduce the amounts of plasticizers, solvents, and other softening agents now generally used.

It is obvious as there is practically no friction on the material passing through the nozzle or machine as above described, only a very small degree of plasticity is required which permits material in the advanced season stages to be pressed or formed. Furthermore, since no inequality of frictional resistance is possible over the surface in contact with the material, there is not the tendency for the final solid product to flow with varying speed or be deformed or warped.

It is not intended to restrict the location of the adjustment means, it being understood that they may be applied to either the top or bottom rolls, or sprocket supports, either independently or in combination as the case may be. I use a plurality of tightening screws as shown, since by so doing I am able to introduce if desired, a continuously graded pressure through the length of the machine, starting with a suitable pressure at the entrance adjacent rolls 13 and 14 for initial forming and increasing to a maximum as it is chilled and sets under the control screws 33'. By this means the whole forming process may be extended over the entire time of travel through the machine. The exact pressure applied depends upon the requirement of the particular material to be pressed and the adjustments may be used to compensate for the expansion under heat and the contraction under cooling and pressure.

The operation of the device shown in Figures 1 and 3 will now be described. The material to be treated is placed in hopper 2 and screw conveyor 4 advances the material and forces it between moving belts 6 and 7 to fill the space therebetween and guides 10 determine the width of the product. The rolls 13 and 14 being hollow, and the belts 6 and 7 being of metal, the temperature of this portion of the device may be controlled by conducting heating or cooling media into the interior of the rolls. As the material passes between rolls 13 and 14 it is initially compressed and as it passes along the supporting blocks 22 exert pressure on the belts so as to hold the material compressed. From here the material passes between the elongated compression areas designated as extending from 44 to 45. Sprocket 36 is rotated, and this causes the simultaneous movement of rollers 40 and blocks 42. As shown in the drawings, the blocks 42 are so mounted that they form a continuous solid surface from 44 to 45. The blocks are mounted on the rolls 40 which press against the support and, therefore, sustained pressure is applied to the material as it passes through this zone. If the temperature of the material need be controlled during the compression, suitable heating or cooling media may be conducted to the interior of the supports.

Cylinders 13 and 14 are hollow or provided with suitable means for respective heating and cooling. By this design I am enabled to adjust the temperature applied to the endless belts 6 and 7 over the nozzle distance at will by introducing either a heating or cooling means into the rolls 13 and 14. The nozzle distance extends from a point adjacent rolls 13 and 14 to point 45. It can be readily seen that belts 6 and 7 being comparatively thin and in contact with rolls 13 and 14, can be quickly heated and cooled by virtue of the heating and cooling media introduced therein. For instance, assuming that the material to be pressed is a thermoplastic, the initial mixture is fed into hopper 2 and fed into the pressing means by conveyor screw 4, live steam is introduced into cylinders 13 and 14 while a cooling means is circulated through supporting frames 26 and 27. Now, when the soft plastic material enters the nozzle at a point adjacent rolls or cylinders 13 and 14, it is subjected to high temperature by virtue of the heating means passing through cylinders 13 and 14, belts 6 and 7 having been in contact with rolls 13 and 14 continue to heat or maintain the temperature of the stock or material to point 44. From point 44 to 45, the stock may be gradually cooled by virtue of the cooling medium passing through frames 26 and 27.

Figure 2:
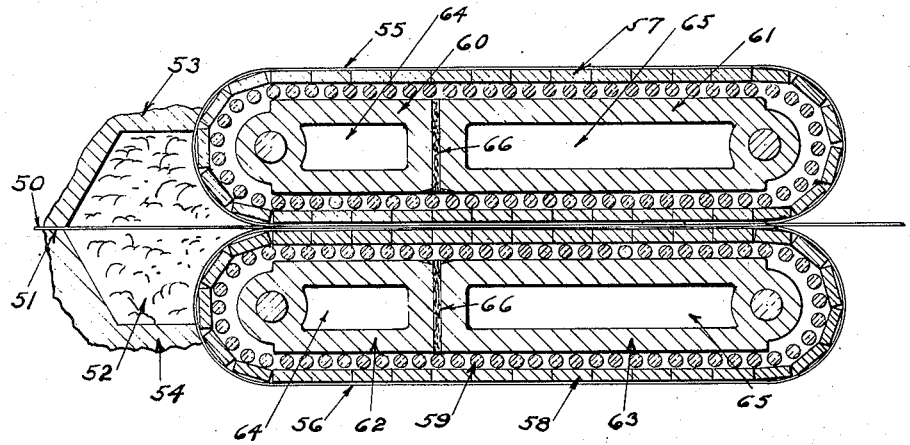
Figure 2 represents a vertical longitudinal cross section through another embodiment arranged to receive material in sheet form.

It is not my intention, however, to limit the possibility of combinations of heating and cooling, as either a hot or cold medium may be passed through frames 26 and 27, or these frames may be heated and cooled as shown in Figure 2, wherein these frames are shown divided into two sections with suitable insulation means between the sections.

Again referring to Figure 1, it has already been mentioned that belts 6 and 7 may be made of material having a hard and highly polished surface, these surfaces coming into contact with the plastic material during the processing, impart a smooth and glassy finish to the latter. The machine thus polishes and finishes the material in addition to pressing and forming and the product emerging at point 45, requires no further treatment. It is to be understood, however, that instead of using smooth surfaced belts and producing smooth composition sheets, I may use belts with surfaces embossed with suitable patterns, which patterns are then impressed on the surface of the plastic composition. In this manner I am able to produce a finished plastic composition with a surface texture simulating that of leather, linen or wood, to produce sheets embossed with formal designs or lettering, to cut the finished sheets into a series of blocks (by attaching transverse knives to the belts). An indefinite variety of products may be finished on my machine by merely installing an appropriate finishing belt. It is even possible to refinish plastic materials which have already been partially or completely processed at some previous time.

From the foregoing description, it will be obvious that there is practically no friction on the material passing over the nozzle or machine and only a very small degree of plasticity is required which permits the material in the advanced, seasoned stages to be pressed or formed. Furthermore, since no inequality of frictional resistance is possible over the surface in contact with the material, there is not the tendency for the final solid product to flow with varying speed or be deformed or warped.

Figure 2 shows another form of the continuous pressing and forming end of my machine which may be used to perform the final finishing or shaping of already seasoned material. The sheet of preformed material 50 is passed through the opening 51 to vapor chamber 52 which has portions 53 and 54 in contact with belts 55 and 56 to form a closed chamber. The sheet then passes between belts 55 and 56 which are supported as described above on blocks 57 and 58 which in turn are supported on rolls 59, which in turn are supported on frames 60, 61, 62, and 63. These frames may be adjusted in respect to one another as already explained. Chambers 64 and 65 may be either heated or cooled, as the case may be. Frames 60 and 61 and frames 62 and 63 may be insulated from each other by the insulation 66. Similar insulation is provided between frames 62 and 63. The chamber 52 may be filled with solvent vapor, and it can be readily seen that the surface of a sheet passing through these solvent vapors will become soft enough so that its thickness or shape may be altered, or its surface polished, or embossed, by means of the pressure and temperature applied in a continuous operation as illustrated in Figure 2.

Figure 4:
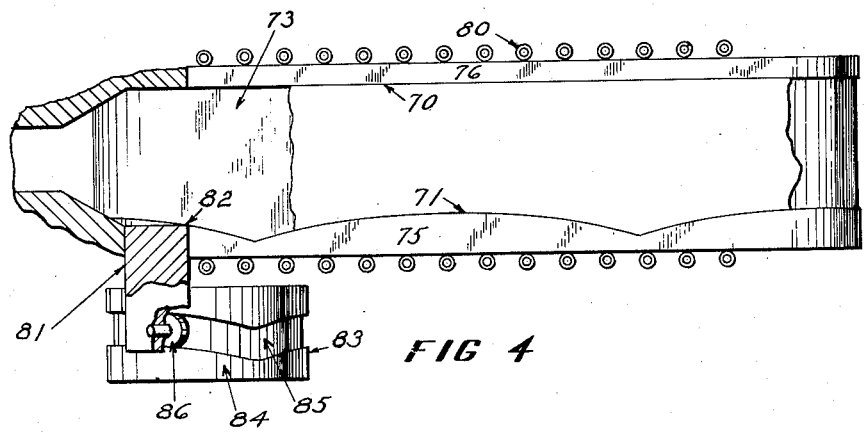
Figure 4 represents a plan view.
Figure 5:
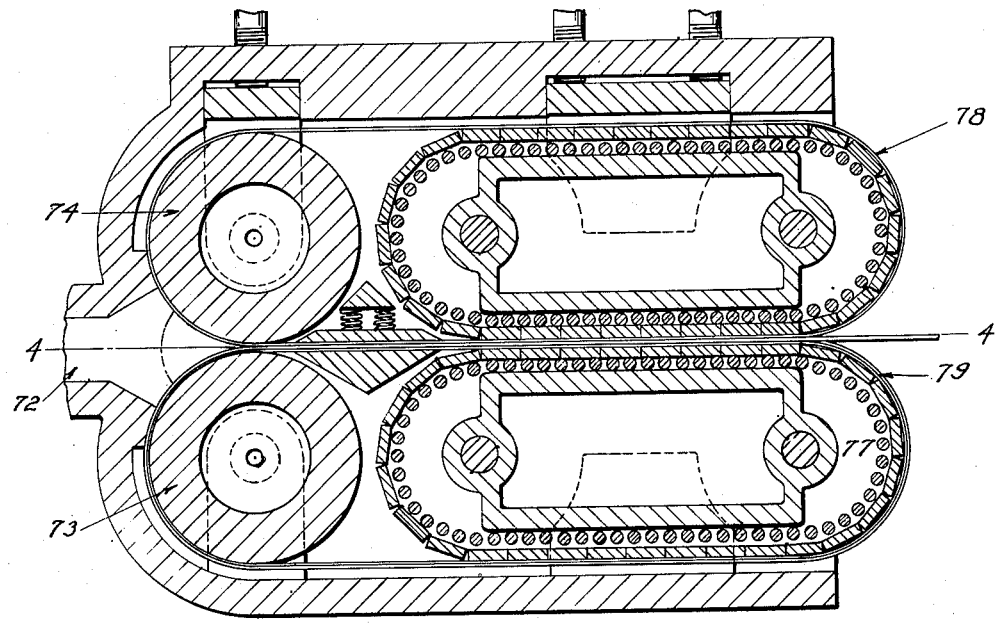
Figure 5 represents a longitudinal vertical cross section of another embodiment embodying the principles of my invention, wherein various finished shapes can be produced.

Figures 4 and 5 illustrate means of accomplishing the forming of various shapes, using the principles of my invention as previously set forth. For the purpose of illustration, I have shown in Figure 4, a device adapted to form a product having one side 70 perfectly straight and having a series of arches on the other side 71. The material is fed in at point 72 by means of a screw or other conveying means and passes between the hollow rolls 73 and 74, as outlined in the description of Figure 1. Spaced belts 75 and 76 pass over roll 73 and sprocket 77 in such a manner as to retain the desired shape of the material as it is pressed between belts 78 and 79 which are similar to the belts shown in Figure 1. Belts 75 and 76 should be made the same thickness as the sheet desired, so that they will act as thickness gauges for the sheet. Rollers 80 are provided to take the outward thrust exerted by the material as it is pressed between belts 78 and 79. Member 81 is a formed slide, the inward and outward motion of which is synchronized with the contour of belt 75 at point 82 through cam operating means 83. This means 83 comprises a drum 84 having a cam groove 85. Slide 81 is provided with a roller 86 adapted to follow groove 85.

Drum 84 may be connected to rotate with roll 73 or other means may be used. In this manner various widths of material may be introduced between rolls 73 and 74 as predetermined by the position of slide 81. While only one irregular edge is shown in Figure 4, it is understood that the same principle may be applied to either or both edges as the case may be so that adjustable means may be provided for guiding both edges.

Figure 6:
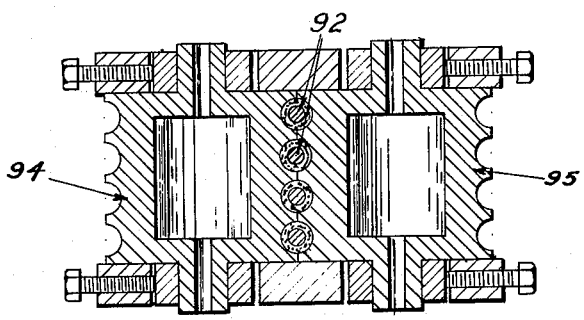
Figure 6 represents a transverse vertical section taken substantially on line 6—6 of Figure 7.
Figure 7:
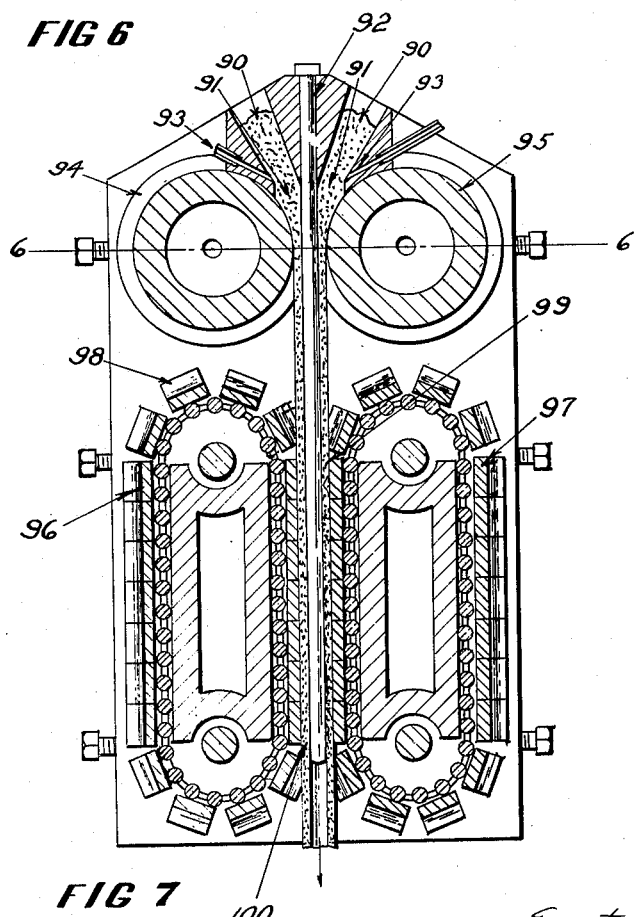
Figure 7 represents a longitudinal vertical section of a device embodying the principles of my invention, wherein various rods, tubing or other shapes can be produced in either plain, mottled or variegated effects.

Referring to Figures 6 and 7, I illustrate another embodiment of my invention serving as means of producing rods, or tubing of either plain or varied effects, such as mottled, stripes, etc., of a material suitable for handling in this machine. To produce a mottled effect tubing for instance, I illustrate in the Figures 6 and 7, a type of mechanism in which the material may be introduced by gravity or other means through space 90 at point 91 around cores 92. Solvent vapor or cement material may be fed in at suitable points 93. The material is then picked up by grooved, hollow rolls 94 and 95 between which it is initially pressed to any desired form. From these rolls the material is carried forward along the cores and enters between two series of blocks 96 and 97 formed to suit the required shapes and may be mounted and driven in such a manner as heretofore described, which may be in caterpillar fashion. As shown in Figure 7 the blocks are formed with cutaway portions 98 which correspond in shape to the grooves in rolls 94 and 95. The blocks are supported in the same manner as the blocks in the previous figures, but it is to be noted that the belts are omitted. From point 99 to 100 the blocks in each series abut each other to form a continuous groove and cooperate with each other to form a continuous groove to press the tubular material and make the final product.

Figure 8:
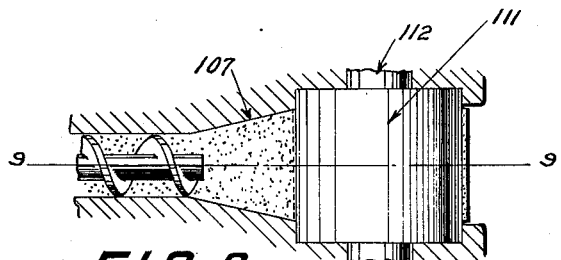
Figure 8 represents a top plan view of another form of my invention.
Figure 9:
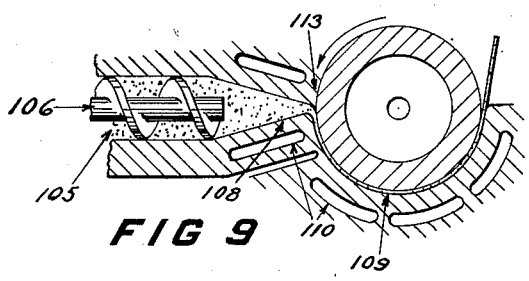
Figure 9 represents a vertical longitudinal cross section taken substantially on line 9—9 of Figure 8.

Figures 8 and 9 illustrate another form of apparatus for practising my invention. In this form, the nozzle for extrusion has a stationary surface and a limited moving surface. The device is provided with a feeding cavity 105 in which is positioned the screw conveyor 106. As shown in Figure 8, the feeding cavity has diverging sides 107, and, as shown in Figure 9, converging top and bottom portions 108 so that the plastic material within the feeding cavity is delivered substantially in sheet form. The device is provided with a semicircular depression 109. Adjacent this depression the apparatus is provided with openings 110 for the circulation of heating or cooling mediums. Rotatably mounted within the device and in depression 109 is a hollow roller 111 provided with the hollow axle 112 to form means whereby heating or cooling fluids may be introduced into the roller 111. The device is formed adjacent the nozzle with portion 113, which is adapted to abut the periphery of roller 111 so as to prevent the plastic material from forcing its way upwards beyond the nozzle. The roller may be mounted upon bearings, or any other similar construction, and may be positively driven in the direction shown by the arrow in Figure 9. The plastic material is forced into the narrowed portion of the feeding cavity against the periphery of the roller and moves in contact with it in the direction in which the roller travels. The roller is mounted within the semicircular cavity 109, but is spaced a sufficient distance therefrom to provide a clearance for receiving the material forced from the feeding cavity. When making certain products, such as films for instance, it is desired to have the nozzle at a suitable temperature for increasing the fluidity of the material and reducing the pressure required. When the material leaving the feeding cavity strikes the moving surface of the roller, it is desirable to have the material chilled and also to chill the material after it has been formed into a sheet. The roller is hollow so as to permit the introduction of a cooling medium and is kept at a substantially constant temperature. It will be found that with the pressure back of the material when it is in contact with the moving surface, the friction will be greatly reduced and the material quickly set, so that it will be carried forward at a speed equal to that of the moving surface. In this manner, the difficulties which have been so serious with the old form of fixed nozzles, as before mentioned, will be overcome.

My invention applies to thermoplastic masses which are processed by heating the masses, plastic or semi-plastic masses in which chemical reactions take place before the final product is obtained, or plastic materials in which it is necessary to eliminate excess solvent to form the final product. By using my invention it is possible to obtain a final seasoned product in one relatively short operation where it has taken days and sometimes months in the prior art. Furthermore, I can obtain various shapes, sizes and finishes in one continuous operation by applying pressure to the material as it is carried along so that a product finished in all particulars is obtained.

From the foregoing descriptions it will be apparent that the metal parts including the cylinders, frames, rollers, blocks, chains, sprockets, and etc., shown in the drawings, are maintained at substantially their respective temperatures during the operation, and it is not necessary to cool all these parts to remove the finished product and a saving is thereby effected. In prior art devices it is necessary to alternately heat up the presses, dies, etc., and then cool all the metal parts used in the operation. This results in great heat losses which are obviated by using my invention.

It is to be expressly understood that my invention may also be used in the manufacture of laminated sheets or products or other materials where a fabric is interposed between sheets to form composite products.

While the above descriptions serve to illustrate the principles of my invention, as well as numerous applications of same, I do not wish to limit myself to the specific embodiments disclosed and described, but believe myself entitled to the exclusive use of all such modifications which may be adjudged to fall fairly within the scope of my invention.

I have used the word "set" to designate the production of the article in its final form.

What I claim is:

1. Method of manufacturing plastic products, which comprises, the forming, pressing and setting of plastic material by extruding the material between moving surfaces, and cooling the extruded material while applying pressure thereto.

2. Pressing and molding mechanism of the type described, comprising, a frictionless nozzle, endless bands passing over hollow cylinders and endless tracks consisting of a series of heavy metal blocks, said cylinders and said blocks being mounted so as to revolve on respective axes and to have a minimum of frictional resistance, means for forcing a plastic mass through said frictionless nozzle, and means for regulating the pressure and temperatures to which the extruded mass is subjected.

3. Pressing and molding mechanism of the type described, comprising, a frictionless nozzle, endless bands passing over hollow cylinders and endless tracks consisting of a series of blocks, said cylinders and said blocks being mounted so as to revolve freely on their axes with a minimum of frictional resistance, means for forcing a plastic mass through said frictionless nozzle, means for regulating the temperature by the admission of a fluid into said cylinders, the supports of said endless tracks disposed in juxtaposition to said endless bands, and means for regulating the pressure along the length of said endless belts.

4. Pressing and molding mechanism of the type described, comprising, a frictionless nozzle, endless bands mounted so as to be moved in the direction of the extrusion, and means for forcing a plastic mass through said frictionless nozzle and between said bands.

5. A mechanism of the type described, comprising a nozzle at the opening of which are located rolls, means whereby the material is conducted between said rolls with minimum friction, and means for limiting the nozzle width comprising side guides between which the plastic mass is carried, one of said guides being adjustable.

6. A device of the character described, comprising a nozzle at the opening of which are located rolls, endless bands associated with said rolls, means whereby the material is forced through said nozzle and between said rolls and bands with minimum friction, and means for adjusting the position of the endless bands with respect to each other, whereby the pressure exerted on the material may be varied.

7. A method of producing products from plastic, semi-plastic or thermoplastic materials, which comprises, extruding heated material and forcing the extruded material against a chilled moving surface and then permitting setting of the material while it is confined and chilled.

8. A method of producing thin sheets such as films, which comprises, forcing heated plastic material through a restricted opening and against a chilled surface, and moving the sheet in a confined space and further chilling it.

EVARTS G. LOOMIS.